(12) United States Patent
Jung

(10) Patent No.: US 9,258,406 B2
(45) Date of Patent: Feb. 9, 2016

(54) APPARATUS AND METHOD FOR CONTROLLING MOBILE DEVICE BY CONVERSATION RECOGNITION, AND APPARATUS FOR PROVIDING INFORMATION BY CONVERSATION RECOGNITION DURING MEETING

(71) Applicant: ELECTRONICS AND TELECOMMUNICATIONS RESEARCH INSTITUTE, Daejeon (KR)

(72) Inventor: Ho Young Jung, Daejeon (KR)

(73) Assignee: ELECTRONICS AND TELECOMMUNICATIONS RESEARCH INSTITUTE, Dae'jeon (KR)

( * ) Notice: Subject to any disclaimer, the term of this patent is extended or adjusted under 35 U.S.C. 154(b) by 162 days.

(21) Appl. No.: 14/030,034

(22) Filed: Sep. 18, 2013

(65) Prior Publication Data

US 2014/0171149 A1 Jun. 19, 2014

(30) Foreign Application Priority Data

Dec. 17, 2012 (KR) .......................... 10-2012-0147429

(51) Int. Cl.
| | |
|---|---|
| *H04B 1/38* | (2015.01) |
| *H04M 1/725* | (2006.01) |
| *H04M 3/42* | (2006.01) |
| *G06F 17/30* | (2006.01) |
| *G10L 15/08* | (2006.01) |
| *G10L 15/18* | (2013.01) |

(52) U.S. Cl.
CPC ..... *H04M 1/72561* (2013.01); *G06F 17/30746* (2013.01); *G06F 17/30867* (2013.01); *H04M 3/42* (2013.01); *G10L 15/1822* (2013.01); *G10L 2015/088* (2013.01)

(58) Field of Classification Search
USPC ............... 455/550.1, 563–567, 403; 379/216, 379/88.01–88.04, 216.01
See application file for complete search history.

(56) References Cited

U.S. PATENT DOCUMENTS

| | | | |
|---|---|---|---|
| 2005/0101308 A1* | 5/2005 | Lee ................................ | 455/416 |
| 2006/0190260 A1* | 8/2006 | Iso-Sipila ..................... | 704/258 |
| 2007/0265850 A1* | 11/2007 | Kennewick et al. .......... | 704/257 |
| 2008/0057911 A1* | 3/2008 | Lauper ........................ | 455/412.1 |
| 2008/0311935 A1* | 12/2008 | Tysowski ..................... | 455/466 |

(Continued)

FOREIGN PATENT DOCUMENTS

| | | |
|---|---|---|
| JP | 2011-205238 A | 10/2011 |
| KR | 1020070031117 A | 3/2007 |

(Continued)

*Primary Examiner* — Dominic E Rego
(74) *Attorney, Agent, or Firm* — Ladas & Parry LLP

(57) ABSTRACT

An apparatus for controlling a mobile device according to the present invention includes: a conversation recognition unit configured to recognize a conversation between users through mobile devices; a user intent verification unit configured to verify an intent of at least one user among the users based on the recognition result; and an additional function control unit configured to execute an additional function corresponding to the verified user's intent in a mobile device of the user. According to the present invention, great contribution may be made to improve communication between users by recognizing the conversation between the users, thereby directly providing information associated with the conversation or providing a service.

20 Claims, 3 Drawing Sheets

(56) References Cited

U.S. PATENT DOCUMENTS

| | | | |
|---|---|---|---|
| 2009/0163200 A1* | 6/2009 | Christian et al. | 455/426.1 |
| 2009/0221321 A1* | 9/2009 | Fields et al. | 455/552.1 |
| 2009/0273659 A1* | 11/2009 | Lee et al. | 348/14.02 |
| 2010/0041420 A1* | 2/2010 | Robke et al. | 455/466 |
| 2010/0067674 A1* | 3/2010 | Lee | 379/100.01 |
| 2010/0157991 A1* | 6/2010 | Kim et al. | 370/352 |
| 2011/0105190 A1* | 5/2011 | Cha et al. | 455/566 |
| 2012/0013921 A1* | 1/2012 | Salgado | 358/1.9 |
| 2013/0023248 A1* | 1/2013 | Lee | 455/414.1 |
| 2013/0029695 A1* | 1/2013 | Rychlik | 455/456.3 |

FOREIGN PATENT DOCUMENTS

| | | |
|---|---|---|
| KR | 1020100115960 A | 10/2010 |
| KR | 20120099443 A | 9/2012 |

* cited by examiner

APPARATUS AND METHOD FOR CONTROLLING MOBILE DEVICE BY CONVERSATION RECOGNITION, AND APPARATUS FOR PROVIDING INFORMATION BY CONVERSATION RECOGNITION DURING MEETING

CROSS-REFERENCE TO RELATED APPLICATIONS

This application claims priority to and the benefit of Korean Patent Application No. 10-2012-0147429 filed in the Korean Intellectual Property Office on Dec. 17, 2012, the entire contents of which are incorporated herein by reference.

TECHNICAL FIELD

The present invention relates to an apparatus and a method for controlling a mobile device through conversation recognition, and an apparatus for providing information to participants in a meeting through conversation recognition during the meeting.

BACKGROUND ART

Currently, a smart phone includes a function of retrieving and then informing a corresponding telephone number when a user inputs a predetermined name into a smart phone using a voice, or searching for and then providing corresponding information when the user inputs a predetermined word desired to be searched using a voice. As described above, a service using voice recognition in a mobile device has been developed so far generally based on an interface between a user and a device.

For example, Korean Patent Application Laid-Open No. 2012-0099443 (published on Sep. 10, 2012) entitled "Voice Actions on Computer Device" is disclosed as a prior art document.

However, in many cases, while having a conversation using a smart phone, a user determines an appointment place, asks a contact number of another person, or demands sharing data stored within the smart phone. However, to search the Internet or to search for a registered contact number during a call interrupts the call. It is difficult to memorize and share all of various information stored in the smart phone while talking over the telephone.

A technology of automatically making a meeting record through voice recognition in the case of proceeding with a meeting is known. However, if a person simply transfers an opinion with only words in the proceedings of meeting, there is difficulty in effectively transferring the opinion and the meeting does not smoothly proceed.

SUMMARY OF THE INVENTION

A function of a mobile device such as a smart phone is being diversified and increasing the number of services by the mobile device and thus, if it is possible to recognize a conversation between users, thereby directly providing information associated with a conversation or providing a service, great contribution may be made to improve communication between users.

Accordingly, the present invention has been made in an effort to provide an apparatus and a method for controlling a mobile device that may recognize a conversation between users, thereby directly providing information associated with a conversation or providing a service.

If it is possible to recognize a conversation between participants in a meeting, thereby directly providing relevant information during the proceedings of meeting, the meeting may smoothly proceed and three-dimensional proceedings of meeting may be enabled.

Accordingly, the present invention has also been made in an effort to provide an apparatus for providing information for the proceedings of meeting that may recognize a conversation between participants in a meeting, thereby directly providing information associated with the conversation during the meeting.

An exemplary embodiment of the present invention provides an apparatus for controlling a mobile device, the apparatus including: a conversation recognition unit configured to recognize a conversation between users through mobile devices; a user intent verification unit configured to verify an intent of at least one user among the users based on the recognition result; and an additional function control unit configured to execute an additional function corresponding to the verified user's intent in a mobile device of the user.

The conversation may be a voice conversation.

The conversation may be a conversation through a mobile messenger.

When the verified user's intent is to search for predetermined information, the additional function control unit may search for the predetermined information through the Internet and may display the search result.

When the verified user's intent is to transfer, to a counter party of the conversation, predetermined information stored in the mobile device, the additional function control unit may search the mobile device for the predetermined information and may display the search result or transmit the search result to a mobile device of the counter party of the conversation.

The predetermined information may include contact number information.

When displaying the search result, the additional function control unit may display the search result on the mobile device of the user and at the same time, may display the search result on the mobile device of the counter party of the conversation.

When the verified user's intent is to determine an appointment place in a predetermined region with a counter party of the conversation, the additional function control unit may display business information corresponding to the predetermined region on the mobile device of the user.

The additional function control unit may display the business information together with a map of the predetermined region.

The additional function control unit may display the business information on the mobile device of the user and at the same time, may display the business information on the mobile device of the counter party of the conversation.

In the case of the verified user's intent, when an intent of a first user is to find a destination and an intent of a second user is to guide the first user, the additional function control unit may take a photo of the surroundings with a camera provided in a mobile device of the first user, transmit the taken photo to a mobile device of the second user, and display, on the mobile device of the second user, the photo transmitted from the mobile device of the first user.

Another exemplary embodiment of the present invention provides a method of controlling a mobile device, the method including: recognizing a conversation between users through mobile devices; verifying an intent of at least one user among the users based on the recognition result; and executing an additional function corresponding to the verified user's intent in a mobile device of the user.

Still another exemplary embodiment of the present invention provides an apparatus for providing information for the proceedings of a meeting, the apparatus including: a conversation recognition unit configured to recognize a conversation between participants in the meeting; an information selection unit configured to select information required for a meeting circumstance, based on the recognition result; and an information search unit configured to search for the selected information and display the search result.

According to exemplary embodiments of the present invention, it is possible to greatly contribute to improving communication between users by recognizing a conversation between users and thereby directly providing information associated with the conversation or providing a service.

It is possible to smoothly proceed with the meeting and enable three-dimensional proceedings of meeting by recognizing a conversation between participants in the meeting and thereby directly providing information associated with the conversation during the meeting.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
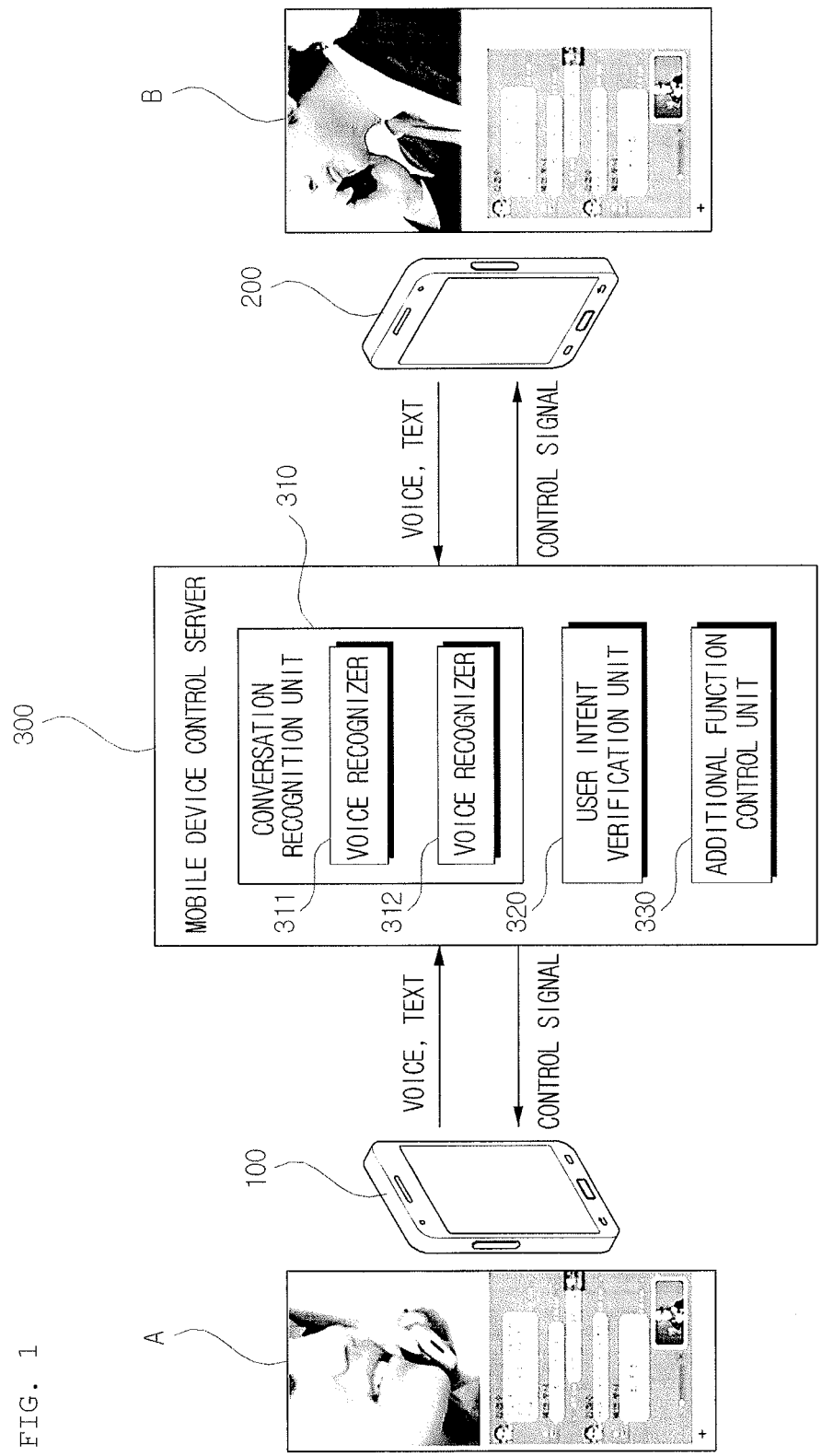
FIG. 1 is a block diagram illustrating an apparatus for controlling a mobile device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following description and accompanying drawings, like reference numerals refer to like constituent elements and thus, a repeated description will be omitted. When it is determined that the detailed description related to a related known function or configuration may make the purpose of the present invention unnecessarily ambiguous in describing the present invention, the detailed description will be omitted here.

FIG. 1 is a block diagram illustrating an apparatus for controlling a mobile device according to an exemplary embodiment of the present invention. As illustrated in FIG. 1, the mobile device control apparatus according to the present exemplary embodiment is configured as a mobile device control server 300. The mobile device control server 300 is connected to a first mobile device 100 and a second mobile device 200 over a wireless communication network. The first mobile device 100 and the second mobile device 200 may be, for example, smart phones, and may also be different types of devices (for example, a tablet personal computer (PC)) supporting a voice call, a messenger service, an Internet service, and the like.

The mobile device control server 300 includes a conversation recognition unit 310, a user intent verification unit 320, and an additional function control unit 330. A portion of or all of the constituent elements of the mobile device control server 300 may be included in each of the first mobile device 100 and the second mobile device 200. For example, the conversation recognition unit 310 and the user intent verification unit 320 may be included in the mobile device control server 300, and the additional function control unit 330 may also be included in each of the first mobile device 100 and the second mobile device 200. All of the conversation recognition unit 310, the user intent verification unit 320, and the additional function control unit 330 may be included in each of the first mobile device 100 and the second mobile device 200. When a constituent element is included in each mobile device, a function of a corresponding constituent element, which will be described below, may be distributed and thereby executed in each mobile device.

In the present exemplary embodiment, a user A has the first mobile device 100 and a user B has the second mobile device 200. The user A and the user B may have a conversation through the first mobile device 100 and the second mobile device 200. The conversation between the user A and the user B may be a voice conversation and a conversation through a mobile messenger. In the case of the voice conversation, a voice signal is input from each of the first mobile device 100 and the second mobile device 200 to the mobile device control server 300. In the case of the conversation through the mobile messenger, a text is input from each of the first mobile device 100 and the second mobile device 200 to the mobile device control server 300.

The conversation recognition unit 310 recognizes a conversation between the users A and B through the first mobile device 100 and the second mobile device 200. To recognize the voice conversation, the conversation recognition unit 310 may include a general voice recognizer 311. To recognize the conversation through the mobile messenger, the conversation recognition unit 310 may include a general text recognizer 312. As a conversation recognition result of the conversation recognition unit 310, a word and a sentence spoken by each of the users A and B or input through the mobile messenger are extracted for each user.

The user intent verification unit 320 verifies an intent of each of the users A and B based on the recognition result of the conversation recognition unit 310. Depending on necessities, intents of both the users A and B may be verified and an intent of any one user between the users A and B may also be verified. Such user's intent may be verified through interpretation of meaning of the word and the sentence, keyword extraction, and various types of recognition models. The verified user's intent may be, for example, to search for predetermined information, to transfer predetermined information stored in a mobile device to a counter party of a conversation or share the predetermined information with the counter party of the conversation, to determine an appointment place, and to find a destination or guide the destination. When an additional function of the mobile device satisfying the user's intent is automatically executed during the conversation as described above, it is possible to solve inconvenience of stopping the conversation and then performing a required behavior, such as search. It is possible to greatly contribute to improving communication between users.

The additional function control unit 330 executes, in a corresponding mobile device, an additional function corresponding to the user's intent verified with respect to each of the first mobile device 100 of the user A and the second mobile device 200 of the user B. To this end, the mobile device control server 300 transmits a control signal corresponding to the corresponding additional function to each of the first mobile device 100 of the user A and the second mobile device 200 of the user B. A further detailed operation of the additional function control unit 330 will be described below with reference to FIG. 2.

Figure 2:
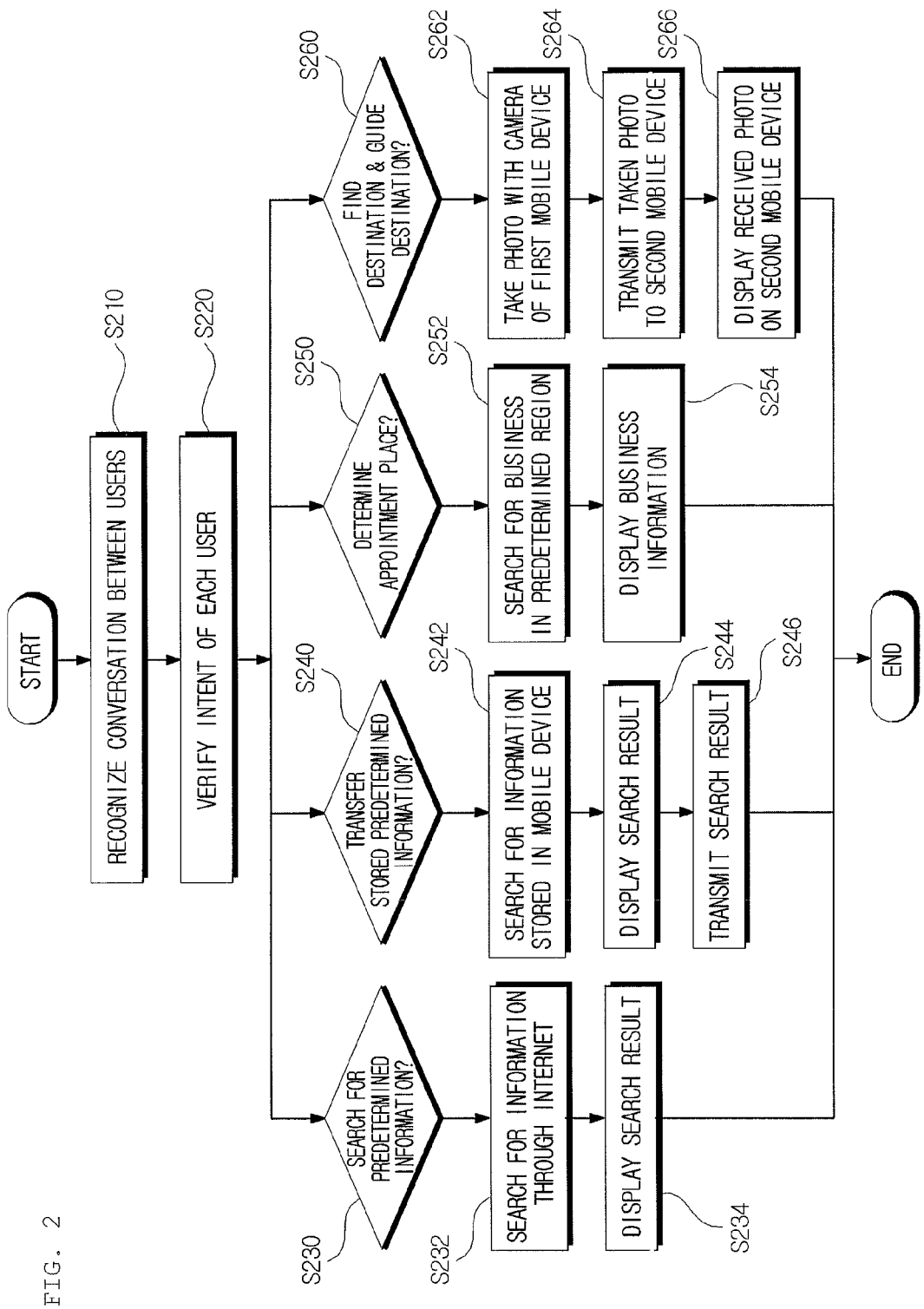
FIG. 2 is a flowchart illustrating a method of controlling a mobile device according to an exemplary embodiment of the present invention.

FIG. 2 is a flowchart illustrating a method of controlling a mobile device according to an exemplary embodiment of the present invention.

The conversation recognition unit 310 recognizes a conversation between the users A and B through the first mobile device 100 and the second mobile device 200 (S210).

The user intent verification unit 320 verifies an intent of each of the users A and B based on the recognition result of operation S210 (S220).

When the verified user's intent is to search for predetermined information (S230), the additional function control unit 330 searches for corresponding information through the Internet (S232) and displays the search result through each of the first mobile device 100 and the second mobile device 200 (S234). Here, by enabling each of the first mobile device 100 and the second mobile device 200 to search for the corresponding information, the corresponding search result may be displayed on each of the first mobile device 100 and the second mobile device 200. The mobile device control server 300 may search for the corresponding information and then transmit the search result to each of the first mobile device 100 and the second mobile device 200.

When the search result is obtained, each of the first mobile device 100 and the second mobile device 200 may display the search result by responding to a predetermined behavior of a user. For example, when the user places a mobile device down from a face while making a call, the search result may be displayed at last.

For example, when a conversation between the user A and the user B relates to determining a theater and a time in order to watch the movie "Twilight", a user's intent is verified to search for screening theaters and a screening timetable of "Twilight". In this case, the additional function control unit 330 controls the first mobile device 100 and the second mobile device 200 to search for the screening theaters and the screening timetable of "Twilight", and to display the corresponding search result. Next, the user A and the user B may verify the screening theaters and timetable displayed on their own mobile devices and may determine a theater and a time together while having a conversation.

When the verified user's intent is to transfer, to a counter party of the conversation, predetermined information stored in a mobile device or to share the predetermined information with the counter party of the conversation (S240), the additional function control unit 330 controls the mobile device of the corresponding user to search for the corresponding information (S242) and to display the search result (S244). Depending on necessities, the additional function control unit 330 may transmit the search result to a mobile device of the counter party of the conversation (S246). As described above, the search result may be displayed by responding to the predetermined behavior of the user.

For example, when the conversation between the user A and the user B relates to a case that the user A informs the user B of a contact number of "Hong gildong", an intent of the user A is verified to transfer the contact number of "Hong gildong" to the user B. In this case, the additional function control unit 330 controls the first mobile device 100 to search for the contact number of "Hong gildong" stored in the first mobile device 100 and to display the contact number of "Hong gildong" when the user places the first mobile device 100 down from a face. Next, the user A may verify the contact number of "Hong gildong" and immediately inform the user B of the verified contact number of "Hong gildong". The first mobile device 100 may transmit the contact number of "Hong gildong" to the second mobile device 200 using a mobile messenger or a short messaging service (SMS) according to a selection of the user A or automatically.

As another example, when the conversation between the user A and the user B relates to sharing a "weekly work plan" stored in the first mobile device 100 of the user A, an intent of the user A is verified to transfer the "weekly work plan" to the user B and display the transferred "weekly work plan", and an intent of the user B is verified to receive the "weekly work plan" from the user A and display the received "weekly work plan". In this case, the additional function control unit 300 controls the first mobile device 100 to search for the stored "weekly work plan" and display the "weekly work plan", and to transmit the "weekly work plan" to the second mobile device 200", and controls the second mobile device 200 to display the "weekly work plan" received from the first mobile device 100. Next, the user A and the user B may have a conversation while viewing the "weekly work plan" together displayed on their own mobile devices.

When the verified user's intent is to determine an appointment place (S250), the additional function control unit 330 searches for a business (for example, a café and a restaurant) of a predetermined region in which the user desires to determine the appointment place (S252) and displays the retrieved business information through a mobile device, for example, the first mobile device 100 and the second mobile device 200, of each user (S254). Here, each of the first mobile device 100 and the second mobile device 200 may display business information together with a map of the predetermined region. In this case, the business information may be displayed by responding to the predetermined behavior of the user.

For example, when the conversation between the user A and the user B includes the content such as "Where do we meet around Gangnam station?", intents of the user A and the user B are verified to determine an appointment place around Gangnam station. In this case, the additional function control unit 330 controls the first mobile device 100 and the second mobile device 200 to search for a café or a restaurant around Gangnam station and to display the search result together with a map of the surroundings of Gangnam station. Next, the user A and the user B may verify the map and the business information displayed alike on their own mobile devices and may determine the appointment place, while having a conversation.

In the case of the verified user's intent, when an intent of the user A is to find a destination and an intent of the user B is to guide the user A to the corresponding destination (S260), the additional function control unit 330 controls the first mobile device 100 to take a photo of the surroundings with a camera (S262) and to transmit the taken photo to the second mobile device 200 (S264). The additional function control unit 330 controls the second mobile device 200 to display the photo transmitted from the first mobile device 100 (S266).

For example, when the conversation between the user A and the user B includes the content such as "user A: I am near your office. How can I get to your office?", an intent of the user A is to find and go to an office of the user B and an intent of the user B is to guide the user A to the office of the user B. In this case, the additional function control unit 330 controls the first mobile device 100 to take a photo of the surroundings (in this case, a guiding comment such as "Please set a camera to face towards the front" may be output to the user A), and to transmit the taken photo to the second mobile device 200. The additional function control unit 330 controls the second mobile device 200 to display the photo transmitted from the first mobile device 100. In this case, a guiding comment such as "The photo of surroundings is being transmitted from the user A" may be output to the user B. Accordingly, the user B may view the photo of surroundings transmitted from the user A and accurately guide the user A to the office of the user B while having a conversation with the user A.

Figure 3:
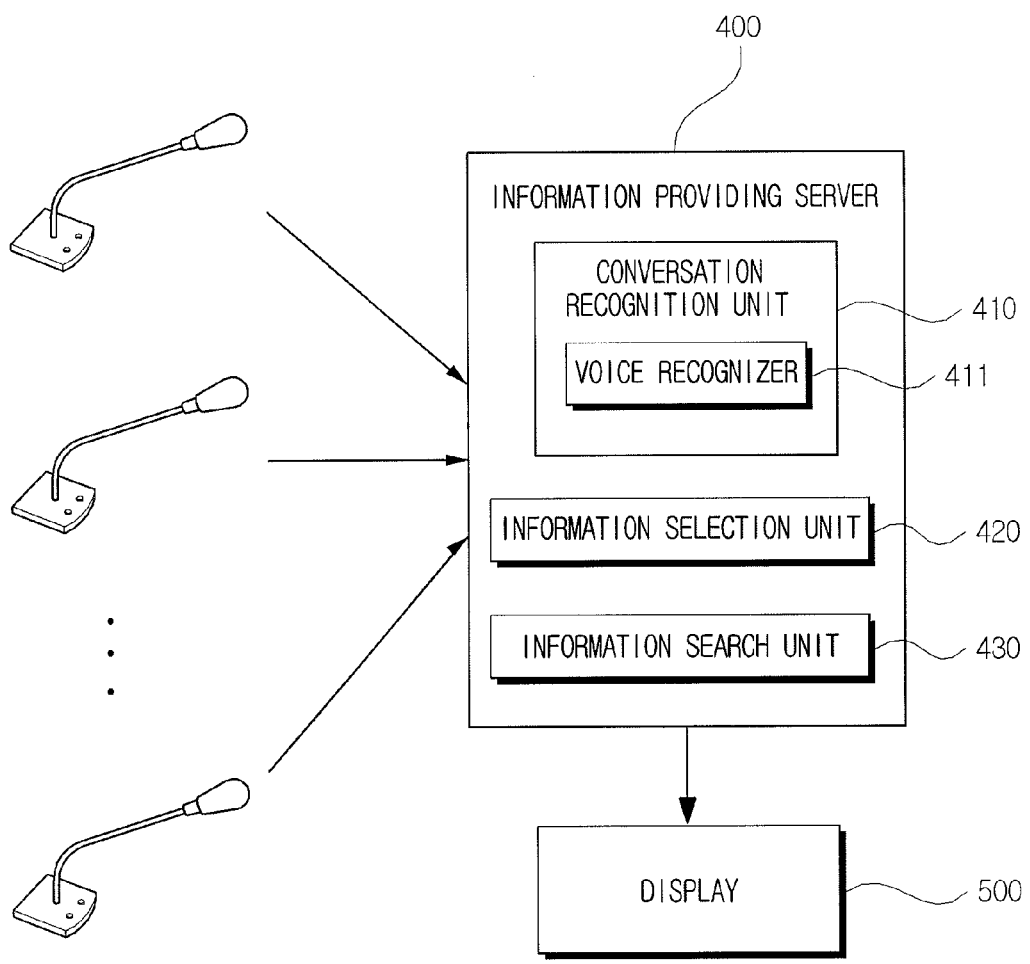
FIG. 3 is a block diagram illustrating an apparatus for providing information for the proceedings of meeting according to an exemplary embodiment of the present invention.

FIG. 3 is a block diagram illustrating an apparatus for providing information for the proceedings of meeting according to an exemplary embodiment of the present invention. As illustrated in FIG. 3, the information providing apparatus according to the present exemplary embodiment is configured as an information providing server 400. The information providing server 400 includes a conversation recognition unit 410, an information selection unit 420, and an information search unit 430.

The information providing server 400 receives a voice signal from each of microphones used by participants in the meeting.

The conversation recognition unit 410 recognizes a conversation between the participants in the meeting based on the input voice signals. The conversation recognition unit 410 may include a general voice recognizer 411. A word and a sentence spoken by each participant in the meeting are extracted for each participant in the meeting based on the conversation recognition result of the conversation recognition unit 410.

The information selection unit 420 selects information required for a meeting circumstance based on the recognition result of the conversation recognition unit 410. Such selection of information may be performed through interpretation of meaning of the word and the sentence, keyword extraction, and various types of recognition models. An importance level of a speaker speaking the word and the sentence and the number of times that the word or the sentence is used may be further considered. Such items to be considered may be set in advance.

The information search unit 430 searches for the selected information and displays the search result on a display 500 provided in a meeting place to be viewed by the participants in the meeting. The display 500 may be a device held by each participant in the meeting and may also be a single device shared by the participants in the meeting. Search of the selected information may be variously performed based on a type of information. For example, in the case of general information, search may be performed through general Internet search. In the case of information provided in a predetermined database, search may be performed through an access to the corresponding database.

For example, when information about a predetermined company is selected as information required for a meeting circumstance during a meeting, the information search unit 430 searches for basic information of the corresponding company through the Internet and displays the search result for participants in the meeting. As another example, when financial statements of their own company is selected as information required for the meeting circumstance during a meeting, the information search unit 430 reads the financial statements by accessing a database of the company and displays the read financial statement for the participants in the meeting.

As described above, by recognizing a conversation between participants in the meeting and thereby providing required information in real time during the meeting, the participants in the meeting may proceed with the further smooth and three-dimensional meeting while sharing the provided information.

Meanwhile, the aforementioned exemplary embodiments of the present invention may be configured as a program executable in a computer and may be implemented in a general purpose digital computer to operate the program using computer readable media. The computer readable media may include storage media such as magnetic storage media (for example, ROM, floppy disk, and hard disk), and optical readable media (for example, CD ROM and DVD).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling a mobile device, the apparatus comprising:
   a conversation recognition unit configured to recognize a conversation between users through mobile devices;
   a user intent verification unit configured to verify an intent of at least one user among the users based on the recognition result; and
   an additional function control unit configured to execute an additional function corresponding to the verified user's intent in a mobile device of the user.

2. The apparatus of claim 1, wherein the conversation is a voice conversation.

3. The apparatus of claim 1, wherein the conversation is a conversation through a mobile messenger.

4. The apparatus of claim 1, wherein when the verified user's intent is to search for predetermined information, the additional function control unit searches for the predetermined information through the Internet and displays the search result.

5. The apparatus of claim 1, wherein when the verified user's intent is to transfer, to a counter party of the conversation, predetermined information stored in the mobile device, the additional function control unit searches the mobile device for the predetermined information and displays the search result or transmits the search result to a mobile device of the counter party of the conversation.

6. The apparatus of claim 5, wherein the predetermined information comprises contact number information.

7. The apparatus of claim 5, wherein when displaying the search result, the additional function control unit displays the search result on the mobile device of the user and at the same time, displays the search result on the mobile device of the counter party of the conversation.

8. The apparatus of claim 1, wherein when the verified user's intent is to determine an appointment place in a predetermined region with a counter party of the conversation, the additional function control unit displays business information corresponding to the predetermined region on the mobile device of the user.

9. The apparatus of claim 8, wherein the additional function control unit displays the business information together with a map of the predetermined region.

10. The apparatus of claim 8, wherein the additional function control unit displays the business information on the mobile device of the user and at the same time, displays the business information on the mobile device of the counter party of the conversation.

11. The apparatus of claim 1, wherein in the case of the verified user's intent, when an intent of a first user is to find a destination and an intent of a second user is to guide the first user, the additional function control unit takes a photo of surroundings with a camera provided in a mobile device of the first user, transmits the taken photo to a mobile device of the second user, and displays, on the mobile device of the second user, the photo transmitted from the mobile device of the first user.

12. The apparatus of claim 1, wherein the additional function control unit is further configured to display a result of execution of the additional function by responding to a predetermined behavior of the user.

13. A method of controlling a mobile device, the method comprising:
    recognizing a conversation between users through mobile devices;
    verifying an intent of at least one user among the users based on the recognition result; and
    executing an additional function corresponding to the verified user's intent in a mobile device of the user.

14. The method of claim 13, wherein the executing of the additional function searches for predetermined information through the Internet and displays the search result when the verified user's intent is to search for the predetermined information.

15. The method of claim 13, wherein the executing of the additional function searches the mobile device for predetermined information and displays the search result or transmits the search result to a mobile device of a counter party of the conversation when the verified user's intent is to transfer, to the counter party of the conversation, the predetermined information stored in the mobile device.

16. The method of claim 15, wherein the executing of the additional function displays the search result on the mobile device of the user and at the same time, displays the search result on the mobile device of the counter party of the conversation when displaying the search result.

17. The method of claim 13, wherein the executing of the additional function displays business information corresponding to a predetermined region on the mobile device of the user when the verified user's intent is to determine an appointment place in the predetermined region with a counter party of the conversation.

18. The method of claim 17, wherein the executing of the additional function displays the business information on the mobile device of the user and at the same time, displays the business information on the mobile device of the counter party of the conversation.

19. The method of claim 13, wherein the executing of the additional function takes a photo of the surroundings with a camera provided in a mobile device of a first user, transmits the taken photo to a mobile device of a second user, and displays, on the mobile device of the second user, the photo transmitted from the mobile device of the first user when an intent of the first user is to find a destination and an intent of the second user is to guide the first user in the case of the verified user's intent.

20. An apparatus for providing information for the proceedings of meeting, the apparatus comprising:
    a conversation recognition unit configured to recognize a conversation between participants in the meeting;
    an information selection unit configured to select information required for a meeting circumstance, based on the recognition result; and
    an information search unit configured to search for the selected information and display the search result.

* * * * *